United States Patent
Shmulevich et al.

(10) Patent No.: US 7,739,310 B1
(45) Date of Patent: Jun. 15, 2010

(54) EXTENSIBLE PORTLET TEMPLATES

(75) Inventors: Igor Shmulevich, San Ramon, CA (US);
Harsh Hatekar, Pleasanton, CA (US);
Gary Tang, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 352 days.

(21) Appl. No.: 11/325,363

(22) Filed: Jan. 3, 2006

(51) Int. Cl.
*G06F 7/00* (2006.01)
*G06F 17/30* (2006.01)
*G06F 15/16* (2006.01)

(52) U.S. Cl. .................. 707/802; 707/805

(58) Field of Classification Search ......... 707/101–200, 707/3, E17.103–E17.109, E17.116–E17.119; 717/107–166; 709/208–224; 715/234–243
See application file for complete search history.

(56) References Cited

U.S. PATENT DOCUMENTS

| | | | |
|---|---|---|---|
| 7,231,267 B2 * | 6/2007 | Bournas et al. | 700/91 |
| 7,266,806 B2 * | 9/2007 | Choi et al. | 717/108 |
| 2003/0014442 A1 * | 1/2003 | Shiigi et al. | 707/513 |
| 2004/0010598 A1 | 1/2004 | Bales et al. | |
| 2004/0122830 A1 * | 6/2004 | Schwartz et al. | 707/100 |
| 2006/0064422 A1 | 3/2006 | Arthurs et al. | |

* cited by examiner

*Primary Examiner*—Cam Y Truong
*Assistant Examiner*—Cecile Vo
(74) *Attorney, Agent, or Firm*—Theodore A. Chen; Krishnendu Gupta (57) ABSTRACT

A method, article of manufacture, and apparatus for building portlets from templates and managing templates are disclosed. In an embodiment, this comprises providing a portlet template with configuration user interface components; and using the configuration user interface components to present the portlet template to a user. Attributes of the portlet to be configured are displayed to the user, portlet configuration information is obtained from the user, and the portlet configuration information is used to set portlet attributes. In an embodiment, attributes of the portlet template to be configured are displayed to the user, portlet template configuration information is obtained from the user, and the portlet template configuration information is used to update the template descriptor and other template components. In an embodiment, the portlet templates may be built by creating child portlet templates based on parent portlet templates. Child portlet templates inherit the properties and components of the parent portlet templates, and may be extended by overriding properties and components. Properties and components are obtained from the most specific template in which they are found.

11 Claims, 11 Drawing Sheets

FIG. 1

```
<portlet>
    <description xml:lang="EN">Portlet displaying the time in different time
zones</description>
    <description xml:lang="DE">Dieses Portlet zeigt die Zeit in verschiedenen
Zeitzonen an. </description>
    <portlet-name>TimeZoneClock</portlet-name>
    <display-name xml:lang="en">Time Zone Clock Portlet</display-name>
    <display-name xml:lang="de">ZeitzonenPortlet</display-name>
    <portlet-class>com.myco.samplets.util.zoneclock.ZoneClock</portlet-class>
    <expiration-cache>-1</expiration-cache>
    <supports>
       <mime-type>text/html</mime-type>
       <portlet-mode>config</portlet-mode>
       <portlet-mode>edit</portlet-mode>
       <portlet-mode>help</portlet-mode>
    </supports>
    <supports>
       <mime-type>text/wml</mime-type>
       <portlet-mode>edit</portlet-mode>
       <portlet-mode>help</portlet-mode>
    </supports>
    <supported-locale>EN</supported-locale>
    <portlet-info>
       <title>Time Zone Clock</title>
       <short-title>TimeZone</short-title>
       <keywords>Time, Zone, World, Clock</keywords>
    </portlet-info>
    <portlet-preferences>
       <preference>
          <name>time-server</name>
          <value>http://timeserver.myco.com</value>
          <modifiable>0</modifiable>
       </preference>
       <preference>
          <name>port</name>
          <value>404</value>
          <modifiable>0</modifiable>
       </preference>
       <preference>
          <name>time-format</name>
          <value>HH</value>
          <value>mm</value>
          <value>ss</value>
       </preference>
    </portlet-preferences>
    <security-role-ref>
       <role-name>trustedUser</role-name>
       <role-link>auth-user</role-link>
    </security-role-ref>
</portlet>
```

Portlet Content Wizard

Headline:

[ Delta Dental Options ]

Link URL (e.g. http://www.emc.com):

[ https://portal.documentum.com/hr/hrportal/benefi ]  Select

Target Window:

[ New Window ▼ ]

Text:

[ Delta Dental provides multiple choices to help you find what is best for you and your family. We have the largest list of participating dentists. ]

Mouse-over Text:

[ Click to follow the link ]

Bullet Image:

[ None ▼ ]

Entitlement:

[ All Users ]

Entitle

[ Submit ] [ Cancel ]

```xml
<?xml version="1.0" encoding="UTF-8"?>
<?dctm original_encoding="UTF-8" has_bom="false" config_locator="090001c980000270"?>
<!-- Copyright (c) 2005. EMC Corporation. All Rights Reserved. -->
<template-descriptor xmlns:xsi="http://www.w3.org/2001/XMLSchema-instance">
    <!-- optional -->
    <extends-template>
        <parent-template-location>AbstractXml</parent-template-location>
    </extends-template>
    <!-- optional, required only if extends-template is not found
    Not used it is represented by template descriptor docbase attribute
    -->
    <template-class>Topic</template-class>
    <config-param>
        <param-name>parameterName</param-name>
        <param-value>parameterValue</param-value>
    </config-param>
    <design-time-components>
        <component>
            <component-name>default-resource-bundle-file</component-name>
            <component-location>/Supporting Files/portlet.properties</component-location>
        </component>
        <component>
            <component-name>portlet-descriptor-schema-file</component-name>
            <component-location>/Supporting Files/dctm_portlet.xsd</component-location>
        </component>
        <component>
            <component-name>topic-content-schema-file</component-name>
            <component-location>/Supporting Files/content/topic_content.xsd</component-location>
        </component>
        <component>
            <component-name>design-view-xsl-file</component-name>
            <component-location>/Supporting Files/content/topicDesignView.xsl</component-location>
        </component>
        <component>
            <component-name>edit-view-xsl-file</component-name>
            <component-location>/Supporting Files/content/topicEditView.xsl</component-location>
        </component>
        <component>
            <component-name>process-add-xsl-file</component-name>
            <component-location>/Supporting Files/content/processAdd.xsl</component-location>
        </component>
        <component>
            <component-name>process-delete-xsl-file</component-name>
            <component-location>/Supporting Files/content/processDelete.xsl</component-location>
        </component>
```

FIG. 8A

```xml
<component>
    <component-name>process-edit-xsl-file</component-name>
    <component-location>/Supporting Files/content/processEdit.xsl</component-location>
</component>
<component>
    <component-name>process-exchange-xsl-file</component-name>
    <component-location>/Supporting Files/content/processExchange.xsl</component-location>
</component>
<component>
    <component-name>images-file-prefix</component-name>
    <component-location>/Supporting Files/portalapp/</component-location>
</component>
<component>
    <component-name>content-filter-xsl-file</component-name>
    <component-location>/Supporting Files/content/contentFilter.xsl</component-location>
</component>
<component>
    <component-name>extract-node-entitle-xsl-file</component-name>
    <component-location>/Supporting Files/content/extractEntitlement.xsl</component-location>
</component>
<component>
    <component-name>ldap-hier-xml-file</component-name>
    <component-location>/Supporting Files/content/ldapHier.xml</component-location>
</component>
<component>
    <component-name>select-entitle-xsl-file</component-name>
    <component-location>/Supporting Files/content/render_LDAP_tree_initialized.xsl</component-location>
</component>
<component>
    <component-name>update-entitle-xsl-file</component-name>
    <component-location>/Supporting Files/content/updateEntitlement.xsl</component-location>
</component>
<component>
    <component-name>template-preview-image</component-name>
    <component-location>/Supporting Files/images/templatePreview</component-location>
</component>
</design-time-components>
<run-time-components>
<component>
    <component-name>portal-app-dir</component-name>
    <component-location>/Supporting Files/portalapp</component-location>
</component>
</run-time-components>
</template-descriptor>
```

FIG. 8B

EXTENSIBLE PORTLET TEMPLATES

BACKGROUND OF THE INVENTION

Portlets are Java-based Web components, managed by a portlet container, that process requests and generate dynamic content. They are used to display relevant information to portal users. Applications for portlets include the display of email, weather reports, discussion forums, and news. Portals use portlets as pluggable user interface components that provide a presentation layer to back-end information systems. Java Specification Request (JSR) 168 Portlet Specification, defined by the Java Community Process, enables interoperability among portlets and web portals, and its disclosure is hereby incorporated by reference. This specification defines a set of APIs (Application Program Interfaces) for portlets and addresses standardization for preferences, user information, portlet requests and responses, deployment packaging, and security.

Creating a portlet typically requires expertise in Java, J2EE (Java 2 Platform Enterprise Edition), XML (Extensible Markup Language), XML Schema, portlet API (application programming interface) such as JSR-168, and other technologies such as content management software. This task is usually performed by consultants, systems integrators, web developers, or other personnel with the requisite technical expertise. Content is supplied by business users who must work with technical personnel who implement the portlets. Further, reusing portlets is often difficult because of limited configuration capabilities, and requires further involvement from technical personnel.

It would be useful, therefore, to have a way to enable business users to more quickly and easily develop portlets without need for expertise in the underlying technologies. Business users would be able to focus on the content creation task without need to deal directly with underlying technologies.

BRIEF DESCRIPTION OF THE DRAWINGS

Various embodiments of the invention are disclosed in the following detailed description and the accompanying drawings.

FIG. 2 illustrates an embodiment of a portlet configuration.

FIG. 8A illustrates an embodiment of a template descriptor for a topic portlet template.

FIG. 8B further illustrates the embodiment of the template descriptor of FIG. 8A.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Efficient portlet building is disclosed. In some embodiments, templates are provided for creating portlets. The templates may include templates for various types of portlets, such as query portlets, topic portlets, auto-publishing portlets, and free-form HTML (hypertext markup language) portlets. In some embodiments, a template framework is provided for developing and maintaining templates. The template framework may be configured to allow the templates to be extensible and have inheritance, facilitating updating and maintenance. In some embodiments, templates may include configuration user interface components for displaying the templates to the user, to facilitate portlet building. In some embodiments, templates may include configuration user interface components for displaying the templates to the user for modification and updates to the templates.

Figure 1:
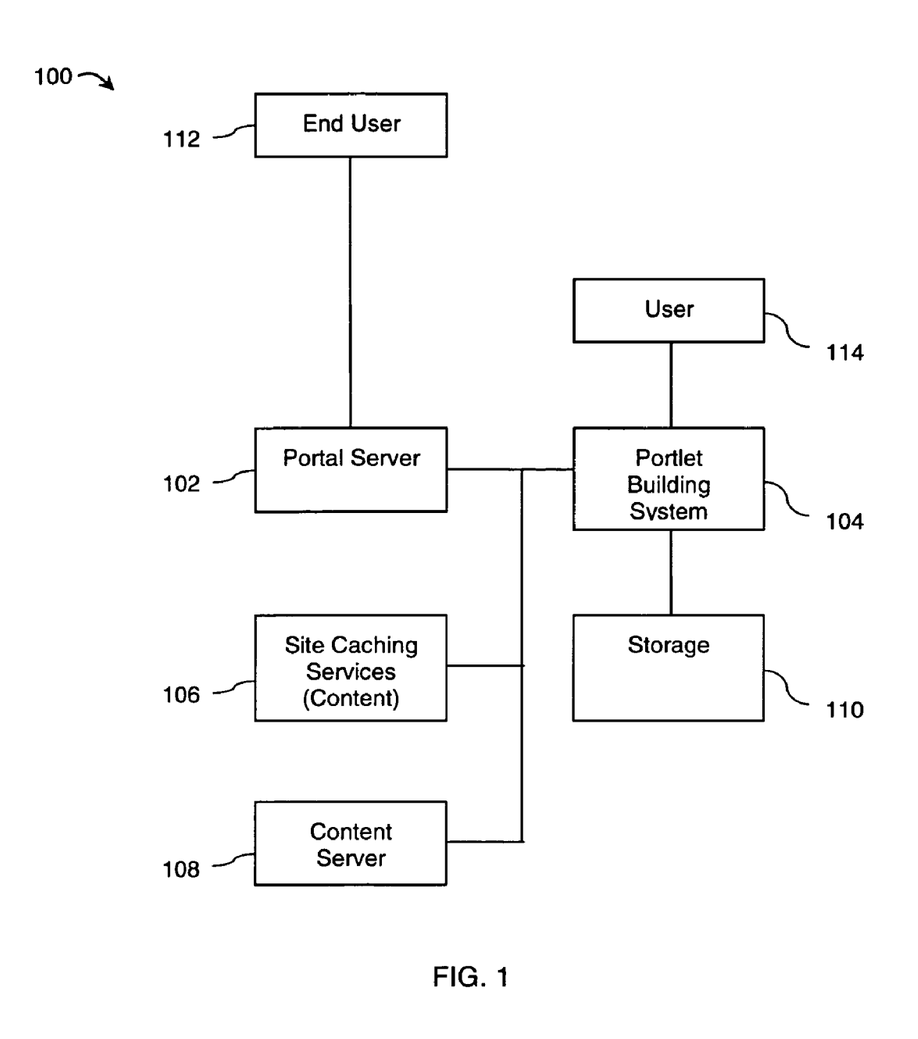
FIG. 1 is a block diagram illustrating an embodiment of a portal system.

FIG. 1 is a block diagram illustrating an embodiment of a portal system that may function as a portal design environment. In this example, the portal system 100 comprises a portal server 102, portlet building system 104, site caching services system 106, content server 108, and portlet template library 110. Any or all of these components may be implemented as a software program executing on a general purpose computer that may comprise a processor, input/output means, a storage system, and a network interface for communicating with other systems over a network. Portal server 102 communicates with end user system 112 to display portlets on the end user system 112. Site caching services system 106 may be used to pre-fetch content and metadata to a standards-based repository, and enable rapid access by the portal server 102. A user system 114 may communicate with portlet building system 104 to develop portlets, and portlet building system 104 may access portlet template library 110 to store, retrieve, or modify portlet templates. Various components may be added or combined as appropriate.

Various components may be implemented as computer code, a hardware device, a software/hardware combination or any other appropriate system or system components. For example, portlet template library 110 may be a storage system configured to store portlet templates, and may be combined with portlet building system 104. Portal server 102 may be combined with site caching services (SCS) system 106, and may share the same filesystem or other storage. Software for various components may be obtained from EMC Corporation, such as Documentum Content Management software, Site Caching Services, and Web Publisher.

Portals may be published by installing them on the portal server 102. In some embodiments, portal server 102 is combined with SCS system 106, and publishing is performed by installing the portal to an SCS target location on the portal server 102. This target location may be a caching location rather than a live location, and the portal server 102 may be configured to make the portal live, as well as designate which of the portal's portlets go live. This may involve using portal-specific tools and/or user interfaces required to import portlets into a portal and assign them to specific portal pages (locations). Publishing a portal typically involves publishing both content files and binary files. This may include portlet application files (Java classes, XML descriptors, resource bundles), portlet content files (XML), and other content files exposed through links in the portlets such as HTML, PDF (portable document format), and DOC files. Publishing may be performed manually or automatically at pre-defined intervals.

In some embodiments, portlets may use the following life-cycle states: Work In Progress (WIP), Staging, Active, and Expired. In an embodiment, when a new portlet is created, it is placed in WIP state and remains in that state until it is promoted to Staging. While in WIP, the portlet descriptor and portlet content can be updated without versioning. The Active state may be used for publishing the portlet to a live portal. Portlets can be promoted from WIP to Staging and from Staging to Active. If a portlet is modified (such as by changing its content, descriptor, or resource bundle) while in the Staging or Active states, a new version of the modified component is created and the entire portlet is demoted to WIP. When a portlet is demoted to WIP, the last published version of the portlet remains available to the Active and Staging portal servers. There may be multiple deployment portal servers, one for each stage. When a portlet is updated, the last Active and Staging versions remain on the Active and Staging portal server, while the WIP portal server will get the new WIP version deployed. It should be understood that more than one server may be used for each stage.

A template framework may be provided for creation of portlets. The template framework may include templates for various types of portlets, such as query portlets, topic portlets, auto-publishing portlets, and free-form HTML portlets. In order for the template framework to cover a wide range of use cases, it should provide the ability to load, configure, and maintain interaction between multiple components including XML files, XSL (extensible stylesheet language) files, XML Schema files, JSP (Java server pages) Pages, Java classes, WebServices payload files, User Interface components and workflow templates (such as Documentum Business Objects, available from EMC Corporation). Different portlets may represent substantially different functionality, requiring a multitude of user interface and configuration options to be supported by the templates. Some structure should be given, because if the templates are very generic, development and maintenance of templates and portlets would be more difficult.

When a portlet is built from a template, the portlet may maintain its relationship with the parent template. In some embodiments, a persistent repository object may be used to signify that the two templates have a parent-child relationship. For example, in the Documentum repository, the dm_relation object is a persistent Documentum repository object that, among other things, signifies that the two templates have parent-child-relationship. The parent template will supply default parameter values and components necessary to configure and run the portlet. A portlet is configured through its attributes. Portlet attributes may be grouped as follows:

General attributes, or attributes used by the portlet building system to manage portlets. All portlets will have the same set of general attributes.

JSR 168 runtime attributes, or attributes used by the portal server and portlets themselves after they are deployed (e.g. portlet title).

Documentum runtime attributes. These attributes are interpreted by the portlets at runtime and deployed/stored as JSR-168 "init-param" and "portlet-preferences" attributes. Portlet-preferences attributes may include Documentum-defined portlet user preferences (e.g., content file name, displayNewTopicsOnly flag, topicsToFilterOut list).

Documentum design-time attributes. Design-time attributes provide a way to integrate with and configure business process and other Documentum components. Design-time parameters are usually used to define and generate proper content for the portlet. They may include, for example, a set of credentials necessary to retrieve external content, a URL to access an RSS (Rich Site Summary, RDF Site Summary, or Really Simple Syndication, depending on the version) feed, or a server name to access an external system like SAP or PeopleSoft.

Portlets may have different sets of runtime and design-time attributes, depending on desired portlet behavior, and these attributes may be specified by the portlet template.

General attributes, in some embodiments, may include portlet name, portlet template (the template that was used to create the portlet), display name, title, short title, description, keywords, and authors. These attributes may be used by the portlet building system to manage portlets, and may be used to generate JSR-168 portlet XML files. JSR-168 runtime attributes are specified in JSR-168, and may include, for example: portlet-name, description (localized description), display-name (localized display-name), portlet-class (the Java class providing runtime implementation, and may be copied from the portlet template), expiration-cache, locale-supported, resource-bundle, init-param (such as name, description, and value), supports, portlet-info (title, short-title, keywords), portlet-preferences (name, value, modifiable—binary flag, preferences-validator). FIG. 2 shows a sample portlet configuration for a portlet displaying the time in different time zones.

In some embodiments, Documentum runtime attributes may be defined through portlet templates. Runtime attributes map to JSR 168 "init-param" attributes (if their values are not subject to change after deployment) or "portlet-preferences" attributes (if they need to be personalizeable). For example, if a topic portlet is created, the Documentum runtime attributes might include the following:

Topic Presentation XSL File
        name="topic-render-xsl-file"
        description="XSL transformation file used to render topic portlet"
        value="$root/render_topic.xsl"
    Topic Preferences Presentation XSL File
        name="topic-preferences-render-xsl-file"
        description="XSL transformation file used to render preferences page for topic portlet"
        value="$roothender_topic_preferences.xsl"
    Topic Source XML File
        name="topic-source-xml-file"
        description="XML file used to retrieve topic portlet content"
        value="$root/topics/$role/marketing_news_topic.xml"
    Topic Source URL
        name="topic-source-url"
        description="URL used to receive external XML file for topic portlet"
        value=http://www.rsacontent.com/topics/marketing news topic.xml?role=$role&lang=$lang code Design-time portlet attributes may be defined through portlet templates, and may be used by a content management system, such as Documentum Content Management products, available from EMC Corporation. The Documentum products include the ability to aggregate content from multiple feeds/sources, either inside or outside a company's firewalls, including Web sites, public folders, file systems, and legacy applications. This may be done via RSS or RDF (Resource Description Framework) templates. An aggregated content topic portlet might include the following design-time attributes:

Aggregated Content Topic
        business-process workflow component="component_ID"
        update-frequency="every_week"

Figure 3:
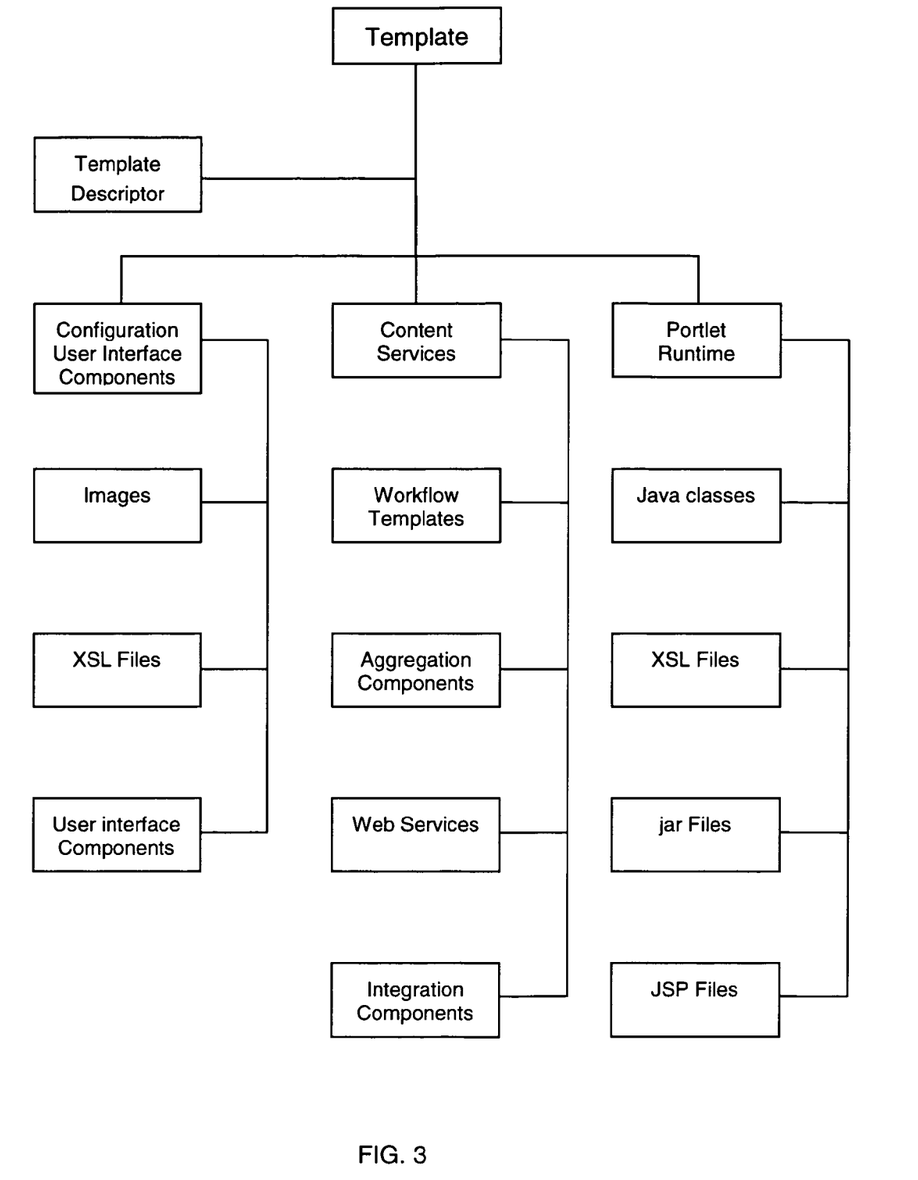
FIG. 3 is a block diagram illustrating an embodiment of template components in a hierarchy.

In some embodiments, each template comprises a template descriptor and supporting files that provide implementation for particular portlet features. The template descriptor may be an XML file that contains a list of all the components and their locations. The locations may be given on the filesystem relative to the template root, or some other type of location information may be provided. FIG. 3 is a diagram illustrating the template components in a hierarchy. As shown, the template may comprise a template descriptor, configuration user interface components, content services components, and runtime components. The template descriptor may be used to describe the various components and their locations, and may vary depending on the type of portlet being built. The template descriptor may also contain a number of parameters stored in name-value form. FIGS. 8A and 8B show an example of a template descriptor associated with a template for a topic portlet. In some embodiments, a hierarchical file system may be used, and component locations may be given relative to the template location. Various storage systems may be used, component locations may be given as absolute pathnames, or component locations may be provided as object references.

Figure 4A:
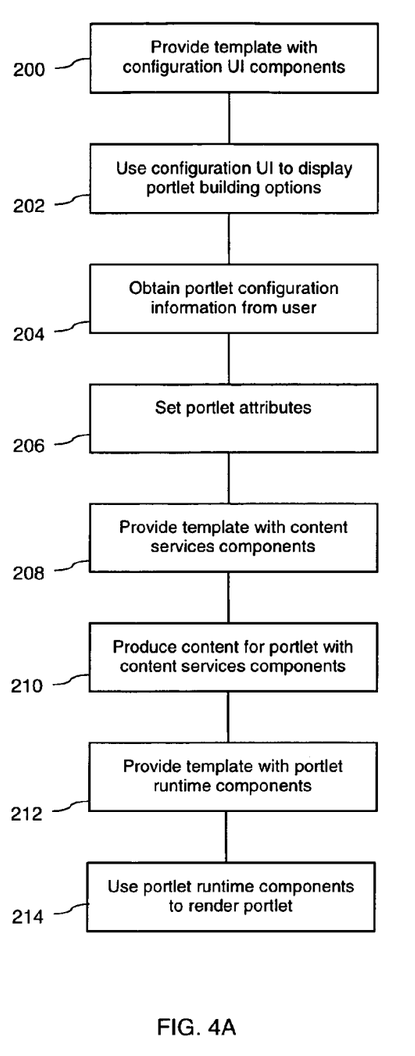
FIG. 4A is a flowchart illustrating using a template in building a portlet.

As shown in FIG. 3, configuration user interface (UI) components may comprise images, XSL files, and user interface components (such as Web Development Kit Components, available from EMC Corporation, which includes pre-built, JSP-based components and XML components that work with J2EE). In some embodiments, the configuration UI components are used by the portlet building system 104 to determine how to present the various template elements available to the user 114. For example, a UI may be presented for selecting a workflow component for an auto-publishing portlet, for specifying when/how frequently auto-publishing portlets should create new content, or for composing content manually (adding new/updating existing topics and links for a topic portlet). FIG. 4A is a flowchart illustrating an embodiment of a process for building a portlet from a template.

Figure 5A:
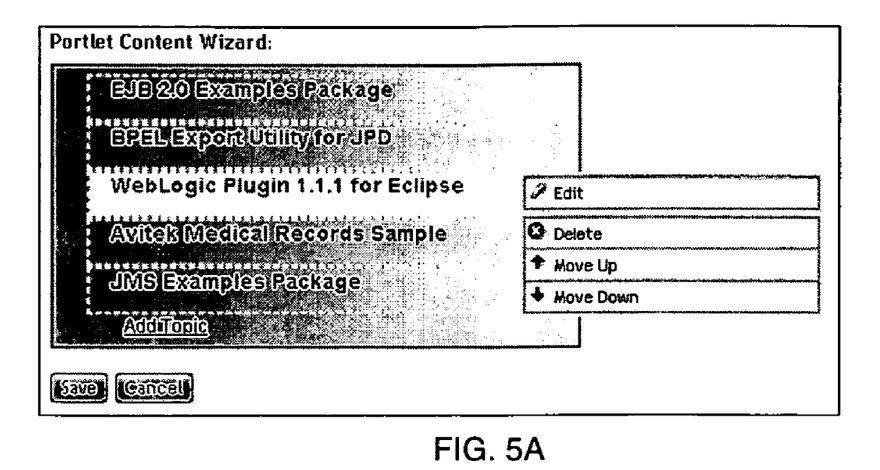
FIG. 5A illustrates a user interface for building a portlet displaying topics.
Figure 5B:
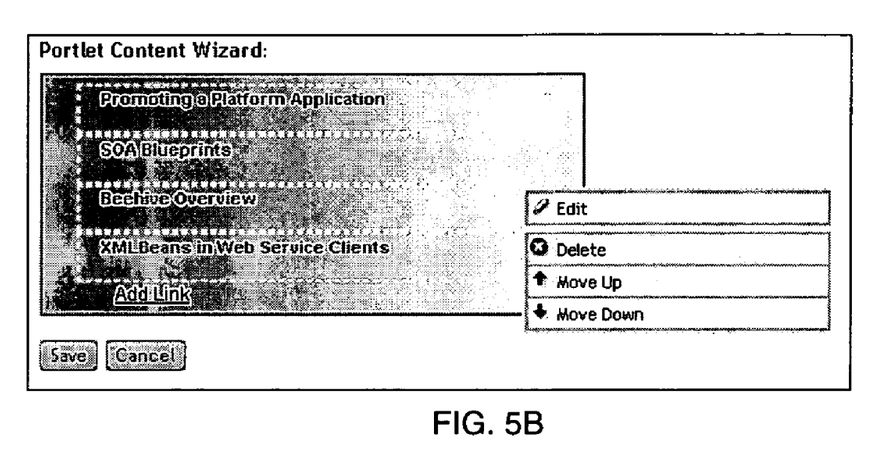
FIG. 5B illustrates a user interface for building a portlet displaying links.
Figure 5C:
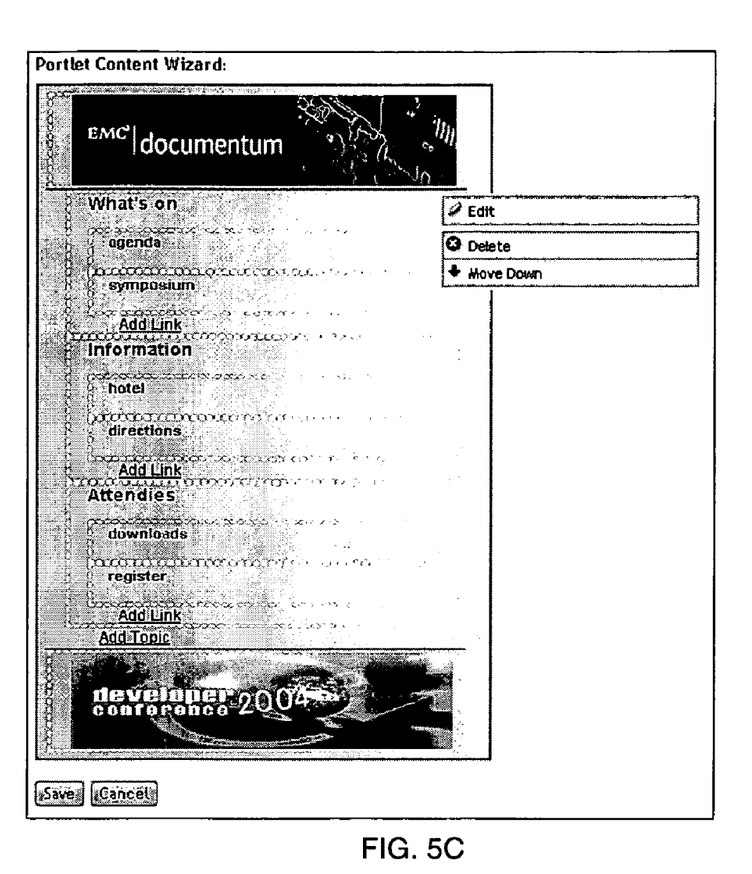
FIG. 5C illustrates a user interface for building a portlet displaying topics and links.
Figure 5D:
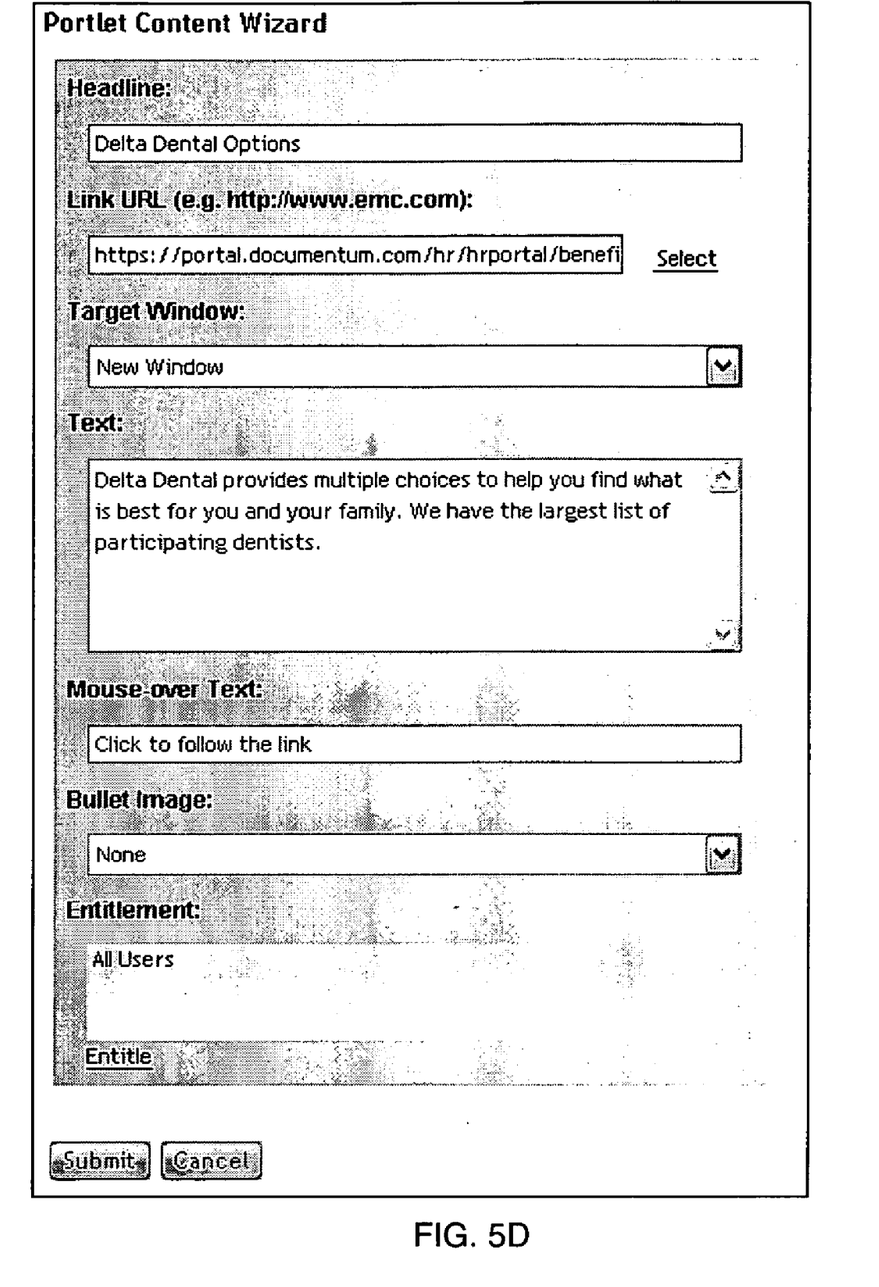
FIG. 5D illustrates a user interface for configuring a topic or link in a portlet.
Figure 5E:
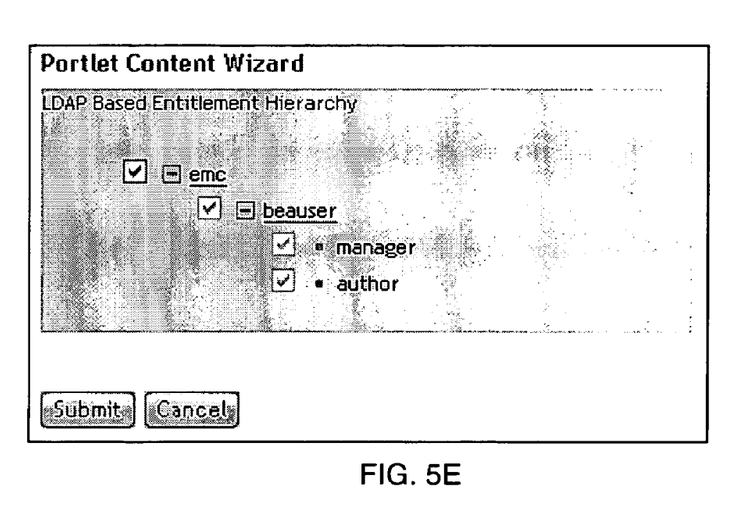
FIG. 5E illustrates a user interface for configuring entitlement in a portlet.
Figure 6A:
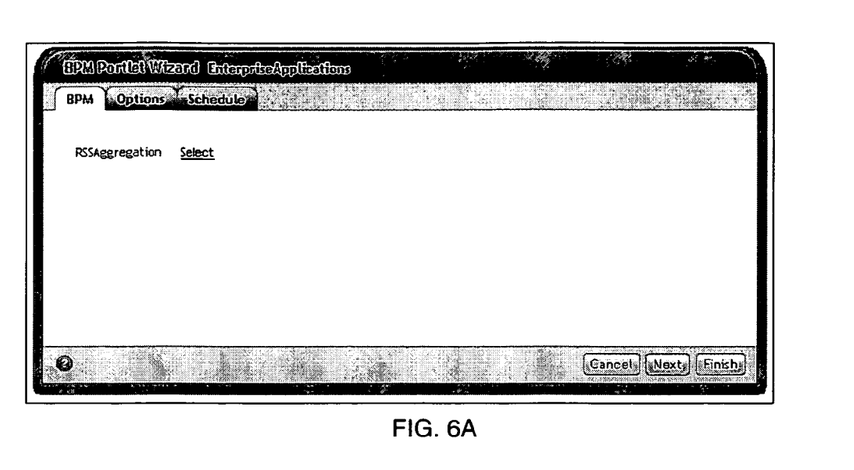
FIG. 6A illustrates a user interface for building an auto-publishing portlet.
Figure 6B:
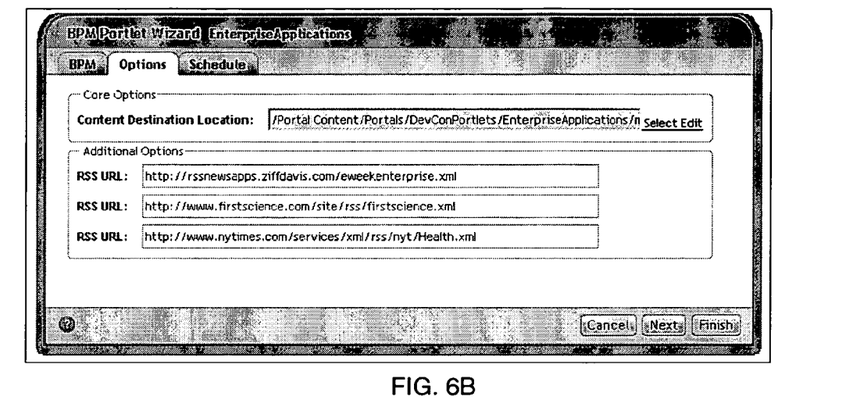
FIG. 6B illustrates a user interface for entering RSS feeds to be aggregated in a portlet.
Figure 6C:
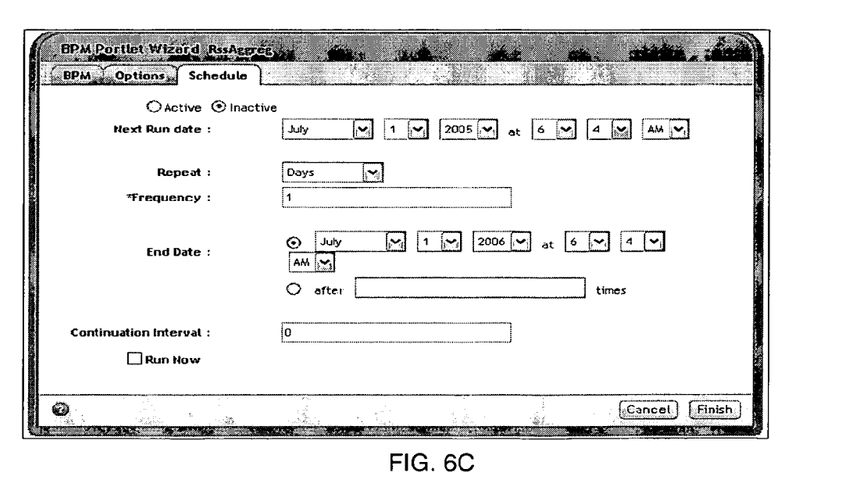
FIG. 6C illustrates a user interface for scheduling execution of a business process.
Figure 7A:
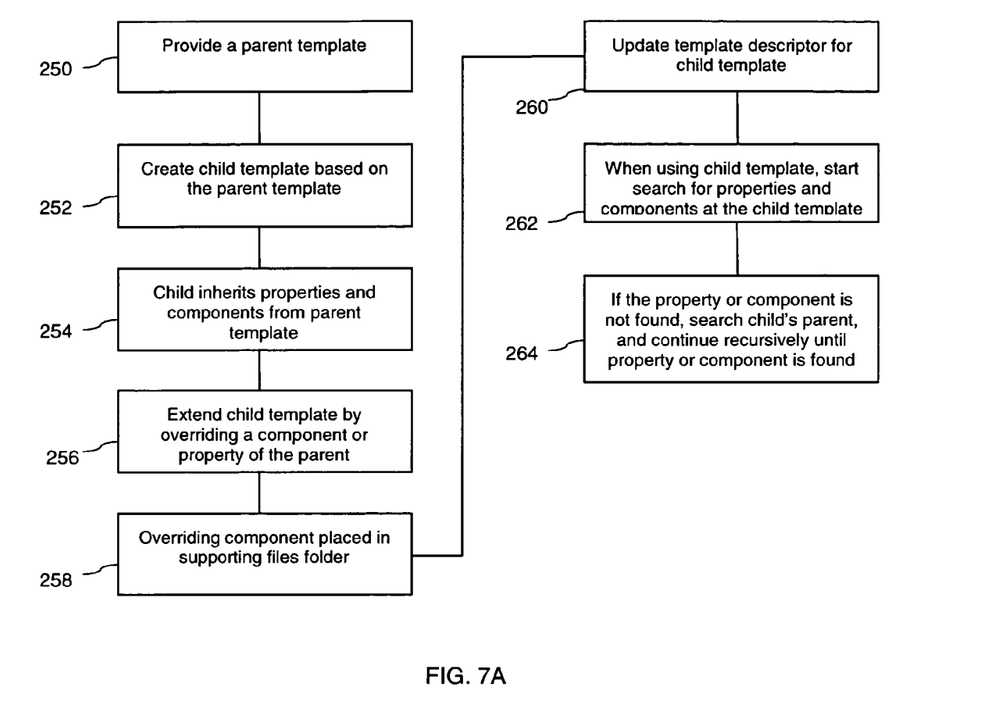
FIG. 7A is a flowchart illustrating template inheritance with extensible templates.
Figure 7B:
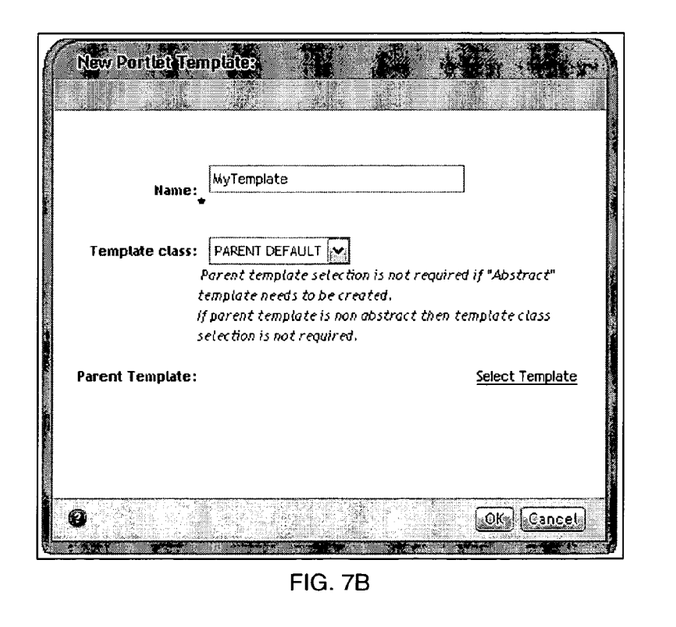
FIG. 7B illustrates a user interface for creating a new portlet template.

The UI may be presented as a wizard-style interface, such as those illustrated in FIGS. 5-7, and may use the configuration UI information provided in the template (step 200) to display portlet building options to the user, step 202. A wizard may be defined as an interactive computer program that acts as an interface to lead a user through a task, using step-by-step dialogs, graphical displays, or other means of asking for and gathering user input. Information is obtained from the user, step 204, and used to set the portlet attributes, step 206.

FIGS. 5A and 5B show a wizard for building portlets displaying a list of topics and links, respectively. FIG. 5A uses a template for displaying a list of topic headings. In some embodiments, the wizard may be configured to support some or all of the following actions:

edit portlet header and footer
    add a new topic
    edit topic heading
        enter a URL for the topic
            content selector may be used to provide a hyperlink to published content in the portal web cabinet
        select a bullet image to be displayed with the topic
        enter a short plain text paragraph to be displayed after the topic
        specify entitlement (e.g. access level) for the topic
    delete topic
        may prevent deletion of the last topic
    move topic up or down (whenever possible)
    preview portlet content FIG. 5B uses a template for displaying a list of links. The wizard may in some embodiments be configured to support some or all of the following actions:

edit portlet header and footer
    add a new link
    edit link heading
        enter a URL for the link
            content selector may be used to provide a hyperlink to published content in the portal web cabinet
        select a bullet image to be displayed with the link
        enter a short plain text paragraph to be displayed after the heading
        specify entitlement (e.g. access level) for the link
    delete link
        may prevent deletion of the last link
    move link up or down (whenever possible)
    preview portlet content FIGS. 5C and 5D show a wizard for building a portlet that displays a list of topics and a list of links for each topic. In FIG. 5C, the wizard may in some embodiments be configured to support some or all of the following actions:

edit portlet header and footer
    add a new topic
    edit topic heading
        enter a URL for the topic content selector may be used to provide a hyperlink to
  published content in the portal web cabinet
select a bullet image to be displayed with the topic
enter a short plain text paragraph to be displayed after
  the topic
specify entitlement (e.g. access level) for the topic
delete topic
  may prevent deletion of the last topic
move topic up or down (whenever possible)
for each topic add a new link
edit link heading
  enter a URL for the link
    content selector may be used to provide a hyperlink to
      published content in the portal web cabinet
  select a bullet image to be displayed with the link
  enter a short plain text paragraph to be displayed after
    the heading
  specify entitlement (e.g. access level) for the link
delete link
  may prevent deletion of the last link within each topic
move link up or down within the parent topic (whenever
  possible)
preview portlet content When the user selects the Edit menu option, the form illustrated in FIG. 5D may be displayed, in order for the wizard to gather information to configure a topic or link. A "Select" button may be provided for opening a browser for the user to select content for the link, and the URL for that link may be displayed in the "Link URL" text box. The "Entitle" button may be provided for allowing the user to configure entitlement (access). In some embodiments, a new window may be displayed after the Entitle link is selected, such as shown in FIG. 5E. Portal user groups may be defined and stored on an LDAP (Lightweight Directory Access Protocol) server. A list of the portal user groups may be obtained from the LDAP server and displayed. The default may be set to entitle all groups to every topic and link, and in this case the top level group will be checked by default. To entitle only a specific group or groups, the user may uncheck the top level group and then check one or more of its children. The entitlement may be hierarchical, i.e., if the parent group is checked all its children are also entitled.

FIGS. 6A, 6B, and 6C show a wizard for building an auto-publishing portlet that may automatically generate its content on a scheduled basis. The process of creating portlet content may be driven by a parameterized workflow template incorporating a number of standard and/or custom activities, such as transformation activity, web service activity, and others. The content in XML format may be retrieved from internal (e.g. content server 108 such as Documentum) and external (web service) sources. The raw XML content may have to go through a few transformations before it becomes suitable for the portlet. The final presentation of the content may be rendered by a template-specific XSL file. A portlet created from this portlet template may be configured to aggregate multiple RSS/RDF feeds into one and convert it to HTML (the later eliminates a need for separate RSS reader). The wizard may be configured to support some or all of the following actions:

select an existing workflow template component
update content destination location
update workflow configuration parameters (e.g., enter one or more RSS-feed URL)
schedule execution of the business process It should be understood that the foregoing templates and wizards have been presented by way of example, and that the concepts presented are not limited to the particular portlet types used for illustration. For example, entitlement may be used with any type of portlet or portlet template.

Content services components may comprise workflow templates, aggregation components, web services, and integration components, and are used to produce content to be used by the portlets built from the template, steps 208 and 210. Portlet runtime components may comprise Java classes, XSL files, jar files, and JSP files, and these runtime components may be used to render the portlet to the end user, steps 212 and 214.

In some embodiments, the template may be implemented as a folder containing a template descriptor object, which will be hidden from the user. The template descriptor may be an XML file containing references to the locations of all the template components. Template components may include a portlet descriptor schema file. The portlet descriptor schema may be used to automatically generate a JSR 168-compliant portlet descriptor XML file and contain all the defaults, e.g.:

Portlet runtime Java class file name (per JSR-168).
Supported MIME-types (per JSR-168).
List of portlet-specific init-param (per JSR-168) entries. Default values may be provided.
List of portlet-specific portlet-preference entries. Default values may be provided. Modifiable flag may be provided, to be used by the portlet building system to determine whether to permit modification.
Other parameters required by the portlet building system and portlet runtime.

Other template components may also reside in the template folder, including but not limited to:

Portlet content schema file defining portlet content format.
Portlet design time rendering XSL file(s).
Portlet runtime rendering XSL file(s).
Portlet runtime Java class file(s) or a jar file.
Default portlet resource bundle properties file.
Default workflow components necessary to automatically generate portlet content.
Default WebService payload files necessary to receive content from external providers.
Other XML/XSL/Java Class files necessary to support the portlet building system and portlet runtime.

In some embodiments, an extensible portlet template framework may distinguish portlet configuration from template customization based on template inheritance. This provides the user with the ability to create multiple portlets from the same template, and also to extend the template without knowing all of the details about how it works. FIG. 7A is a flowchart illustrating an embodiment of a process for extending templates.

When a new template is introduced, it may be either created from scratch or based on an existing template such as the parent template provided in step 250, and inherit all of the properties and components of the existing (parent or ancestor) template, including parameters. The latter approach facilitates reuse of templates. As shown in FIG. 7A, the child template may be created based on the parent template, step 252, and inherit properties and components of the parent template, step 254. For inherited (child or successor) templates, new features may be added by overriding only the specific components that the user desires to change, without replicating any components that do not change, step 256. Overriding components may be placed in a storage, such as a supporting files folder, step 258. A list of overridden components may be stored in the template descriptor for the inherited template, step 260. Because the user does not need to recreate the unchanged components, the user will not need to understand the details of the unchanged components or how they work.

In some embodiments, the portlet building system should have access to template components referenced by component keys in the template descriptor, such as those identified by the component-name fields in FIGS. 8A and 8B. The search process starts from the most specific template, looking through supporting files for that template, step 262. If the component key is not found then the process repeats recursively for each inheritance ancestor template until the component is found, step 264. Each template may have a parent template, up to the root parent template (whose parent template would be null). This guarantees finding the proper template component regardless of whether it is part of the extended (child) template or parent template. In some embodiments, this approach may be applied to template parameters as well.

Fixing or enhancing an existing template may break backward compatibility for portlets already created from that template. By extending the old template, instead of changing it directly, the backward compatibility is maintained, if desired. If it is desired to change a component in all child templates as well as the parent template, such as when a serious flaw has been identified, this may be accomplished by changing the component in the parent template. This change will be reflected in all templates based on that parent template, including portlets built from those templates, provided that the component has not been overridden in those templates (in which case the overriding component would be used). This may be applied to parameters as well.

Often, it is desirable to make small changes to an existing template, while retaining most of its functionality and components. This may be done through extending (inheriting) a template rather than creating a new template. The extension template is not required to have all the parameters and components, only the ones that were overridden. For those parameters and components that have not been overridden in the extension template, the values or components from the closest parent may be used.

Figure 4B:
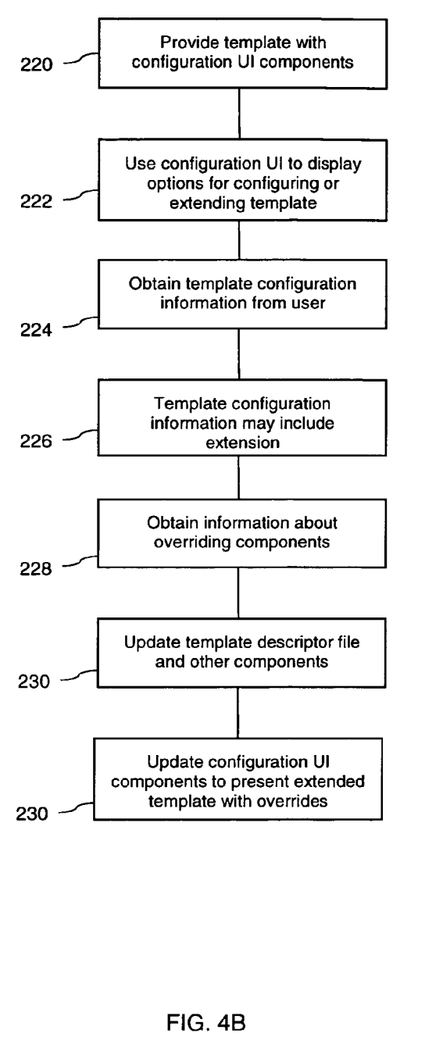
FIG. 4B is a flowchart illustrating extending a portlet template.

The portlet building system 104 may provide a user interface for browsing portlet templates, creating new templates, deleting templates, and viewing the hierarchy of templates. FIG. 4B is a flowchart illustrating an embodiment of a process for extending templates. Modifying existing and creating new templates may require updating the template descriptor XML file, as well as some other XML, XML Schema, and XSL components. In some embodiments, a user interface may be provided for viewing and updating these. The user interface may be in the form of a wizard, dialog-based, or other mode of interaction with the user. The configuration user interface components in the templates may include information on how to alter the template, to be used by the user interface for displaying template change options, gathering user input, and updating the template descriptor XML file as well as other XML, XML Schema, and XSL components. Step 220.

In some embodiments, a new portlet template may be created by extension of an existing template. FIG. 7 illustrates a user interface for creating the extension template, with the following actions that may be taken by the user:

Enter Template Name

Select Template Class from drop-down box (unchanged from PARENT DEFAULT in this example)

Select Parent Template that needs to be extended

Click OK button after all information has been entered

The configuration user interface components are used to display options to the user for configuring or extending the template, step 222, and information is obtained from the user, step 224, which may contain template extension information, step 226. The portlet building system 104 will create a new portlet template object represented by a folder with the same name as the new template (if a hierarchical filesystem is used with the portlet building system 104). A template stub infrastructure may be created inside the folder, and include the XML template descriptor object (which may have the same name as the new template) and a storage, such as a folder, for supporting files. Additionally, the portlet building system 104 may store the inheritance relationship between the new template and the parent template.

The newly created template is identical to the parent template at this point. In order to extend or alter the functionality provided by the parent template, one or more template components (e.g., an XSL file, a workflow template, etc.) may be overridden. This overriding information may be obtained from the user, step 228. Overriding the component(s) may be accomplished by placing the updated component(s) into a storage associated with the template (such as the supporting files folder or one of its subfolders), and updating the template descriptor XML to reference the location(s) of the updated component(s). In step 230, updates may be made to the template descriptor XML file as well as other XML, XML Schema, and XSL components. The configuration user interface components may be updated to present the newly extended template with overriding components, step 232.

A user interface may be provided for performing these actions. For example, a wizard could be configured to obtain information from the user about which component is being changed, presenting a list of component names from the template descriptor XML file so that the user may select the component being changed. If a new component is being added, an option may be presented to the user for adding a new component name, and a text box opened for the user to enter the new component name. After identifying the component-name being changed or added, the user may then browse for the location of the component, and move it to the appropriate supporting files folder (or one of its subfolders). The wizard would then record the location of the file in the template descriptor XML file.

Efficient portlet building has been disclosed. The techniques described allow the user to efficiently build portlets, and develop and maintain portlet templates without having to know all the technical details. Templates can be modified and updated easily, without affecting portlets built from earlier templates, and/or without requiring manual application propagation of changes throughout.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of building a portlet template, the method comprising:

providing a parent portlet template for a portlet including a pluggable user interface pluggable into a portal for display, wherein the parent portlet template includes a template descriptor, configuration user interface components, content services components, and portlet runtime components having extensible stylesheet language (XSL) files;

wherein the template descriptor includes location information about configuration user interface components, content services components, and portlet runtime components having XSL files;

wherein configuration user interface components includes at least one from the group comprising images, XSL files, and user interface components;

wherein content services components produce content used by a portlet;

wherein portlet runtime components having XSL files render the portlet to an end user;

creating a child portlet template based on the parent portlet template;

causing the child portlet template to inherit properties of the parent portlet template;

displaying the child portlet template;

extending the child portlet template, wherein the extending the child portlet template includes overriding a property of the parent portlet template, wherein the overriding includes updating the template descriptor of the child portlet template and using the child portlet template to build a portlet;

wherein the using the child portlet template includes searching for at least one component in the storage associated with the child portlet template; and wherein the using the child portlet template further includes searching for at least one component in a storage associated with the parent portlet template, wherein the parent portlet template has its own parent template, and the using the child portlet template includes searching for the at least one component in a storage associated with the parent template of its parent template.

2. The method as recited in claim 1, further comprising configuring the child portlet template to use components of the parent portlet template.

3. The method as recited in claim 1, wherein extending the child portlet template includes adding a new feature by overriding a component of the parent portlet template.

4. The method as recited in claim 3, wherein overriding the component includes placing an overriding component in a storage associated with the child portlet template.

5. The method as recited in claim 4, wherein the storage is a supporting files folder associated with the child portlet template.

6. The method as recited in claim 4, wherein overriding the component further includes updating the template descriptor of the child portlet template.

7. The method as recited in claim 1, wherein each parent template has its own parent template, and using the child portlet template includes recursively searching storage associated with each parent template until the component is found.

8. A computer program product for building a portlet template, the computer program product being embodied in a computer readable storage medium and comprising computer instructions for:

providing a parent portlet template for a portlet including a pluggable user interface pluggable into a portal for display, wherein the parent portlet template includes a template descriptor, configuration user interface components, content services components, and portlet runtime components having extensible stylesheet language (XSL) files;

wherein the template descriptor includes location information about configuration user interface components, content services components, and portlet runtime components having XSL files;

wherein configuration user interface components includes at least one from the group comprising images, XSL files, and user interface components;

wherein content services components produce content used by a portlet;

wherein portlet runtime components having XSL files render the portlet to an end user;

creating a child portlet template based on the parent portlet template;

causing the child portlet template to inherit properties of the parent portlet template;

displaying the child portlet template;

extending the child portlet template, wherein the extending the child portlet template includes overriding a property of the parent portlet template, wherein the overriding includes updating the template descriptor of the child portlet template, and;

using the child portlet template to build a portlet;

wherein the using the child portlet template includes searching for at least one component in the storage associated with the child portlet template; and wherein the using the child portlet template further includes searching for at least one component in a storage associated with the parent portlet template, wherein the parent portlet template has its own parent template, and the using the child portlet template includes searching for the at least one component in a storage associated with the parent template of its parent template.

9. The computer program product as recited in claim 8, further comprising computer instructions for configuring the child portlet template to use components of the parent portlet template.

10. The computer program product as recited in claim 8, wherein extending the child portlet template includes adding a new feature by overriding a component of the parent portlet template.

11. A system for building a portlet template, comprising:

a memory; and a processor configured to:

provide a parent portlet template for a portlet including a pluggable user interface pluggable into a portal for display, wherein the parent portlet template includes a template descriptor, configuration user interface components, content services components, and portlet runtime components having extensible stylesheet language (XSL) files;

wherein the template descriptor includes location information about configuration user interface components, content services components, and portlet runtime components having XSL files;

wherein configuration user interface components includes at least one from the group comprising images, XSL files, and user interface components;

wherein content services components produce content used by a portlet;

wherein portlet runtime components having XSL files render the portlet to an end user;

create a child portlet template based on the parent portlet template;

cause the child portlet template to inherit properties of the parent portlet template;

display the child portlet template;

extending the child portlet template, wherein the extending the child portlet template includes overriding a property of the parent portlet template, wherein the overriding includes updating the template descriptor of the child portlet template;

using the child portlet template to build a portlet;

wherein the using the child portlet template includes searching for at least one component in the storage associated with the child portlet template; and wherein the using the child portlet template further includes searching for at least one component in a storage associated with the parent portlet template, wherein the parent template has its own parent template, and the using the child portlet template includes searching for the at least one component in a storage associated with the parent portlet template of its parent template.

* * * * *